(12) United States Patent
Lin et al.

(10) Patent No.: US 9,874,660 B2
(45) Date of Patent: Jan. 23, 2018

(54) HARDCOAT COMPOSITION AND POLARIZER AND DISPLAY DEVICE APPLYING THE SAME

(71) Applicant: INDUSTRIAL TECHNOLOGY RESEARCH INSTITUTE, Hsinchu (TW)

(72) Inventors: Hsien-Kuang Lin, Hsinchu (TW); Sue-May Chen, Taipei (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 175 days.

(21) Appl. No.: 14/850,942

(22) Filed: Sep. 10, 2015

(65) Prior Publication Data

US 2016/0077242 A1  Mar. 17, 2016

(30) Foreign Application Priority Data

Sep. 11, 2014  (TW) .............................. 103131314 A

(51) Int. Cl.
| | | |
|---|---|---|
| *G02B 5/30* | (2006.01) | |
| *G02B 1/14* | (2015.01) | |
| *C09D 4/06* | (2006.01) | |
| *C09D 5/00* | (2006.01) | |
| *G02B 1/04* | (2006.01) | |
| *C09J 133/06* | (2006.01) | |

(52) U.S. Cl.
CPC ................. *G02B 1/14* (2015.01); *C09D 4/06* (2013.01); *C09D 5/00* (2013.01); *G02B 1/04* (2013.01); *G02B 5/305* (2013.01); *C09J 133/066* (2013.01)

(58) Field of Classification Search
CPC ... G02B 1/00; G02B 1/04; G02B 1/10; G02B 1/105; G02B 1/14; G02B 1/18; G02B 5/30; G02B 5/3025; G02B 27/28
USPC ................. 359/483.01, 489.01, 489.07, 507; 353/20; 362/19; 349/96, 122, 162
See application file for complete search history.

(56) References Cited

U.S. PATENT DOCUMENTS

| | | | |
|---|---|---|---|
| 4,342,793 A * | 8/1982 | Skinner | ................. C08G 18/62 427/493 |
| 4,580,876 A | 4/1986 | Stolov et al. | |
| 5,071,648 A | 12/1991 | Rosenblatt | |
| 5,148,309 A | 9/1992 | Yamada et al. | |
| 5,408,357 A | 4/1995 | Beukema | |
| 5,738,918 A | 4/1998 | Shen et al. | |
| 5,746,857 A | 5/1998 | Murata et al. | |
| 5,820,957 A | 10/1998 | Schroeder et al. | |
| 5,825,542 A | 10/1998 | Cobb, Jr. et al. | |
| 5,880,800 A | 3/1999 | Mikura et al. | |
| 5,886,799 A | 3/1999 | Molteni et al. | |
| 5,948,673 A | 9/1999 | Cottingham | |
| 6,018,419 A | 1/2000 | Cobb, Jr. et al. | |
| 6,020,983 A | 2/2000 | Neu et al. | |
| 6,045,894 A | 4/2000 | Jonza et al. | |
| 6,074,729 A | 6/2000 | Watanabe et al. | |
| 6,107,244 A | 8/2000 | Zeira et al. | |
| 6,117,497 A | 9/2000 | Murahara et al. | |
| 6,181,394 B1 | 1/2001 | Sanelle et al. | |
| 6,264,336 B1 | 7/2001 | Epstein et al. | |
| 6,288,172 B1 | 9/2001 | Goetz et al. | |
| 6,344,263 B1 | 2/2002 | Moshrefzadeh et al. | |
| 6,357,880 B2 | 3/2002 | Epstein et al. | |
| 6,365,169 B1 | 4/2002 | Rosenblatt | |
| 6,368,699 B1 | 4/2002 | Gilbert et al. | |
| 6,394,595 B1 | 5/2002 | Jiang et al. | |
| 6,444,076 B1 | 9/2002 | Herndon et al. | |
| 6,455,140 B1 | 9/2002 | Whitney et al. | |
| 6,473,220 B1 | 10/2002 | Clikeman et al. | |
| 6,475,609 B1 | 11/2002 | Whitney et al. | |
| 6,552,145 B1 | 4/2003 | Okada et al. | |
| 6,559,834 B1 | 5/2003 | Murakami et al. | |
| 6,590,711 B1 | 7/2003 | Gardner et al. | |
| 6,600,529 B1 | 7/2003 | Kusumoto et al. | |
| 6,626,545 B2 | 9/2003 | Gardner et al. | |
| 6,630,970 B2 | 10/2003 | Trapani et al. | |
| 6,645,624 B2 | 11/2003 | Adefris et al. | |
| 6,659,608 B2 | 12/2003 | Yamamoto et al. | |
| 6,661,487 B2 | 12/2003 | Takahashi et al. | |
| 6,665,029 B2 | 12/2003 | Kondo et al. | |
| 6,689,426 B1 | 2/2004 | Murahara et al. | |
| 6,697,130 B2 | 2/2004 | Weindorf et al. | |

(Continued)

FOREIGN PATENT DOCUMENTS

| | | | |
|---|---|---|---|
| CN | 101412860 A | 4/2009 | |
| CN | 102269838 A | 12/2011 | |

(Continued)

OTHER PUBLICATIONS

Min Soo Yang et al., "Fabrication of poly(methyl methacrylate) microsphere added pressure-sensitive adhesives and their physical characteristics", 2010.
Andrew G. Bachmann "Advances in Light Curing Adhesives".
Alexander Lazarev et al., "Coatable Retarder Technology for LCD Home TV", 2008.
Min Soo Yang et al., "Effect of Glass Transition Temperature of Pressure Sensitive Adhesives on Light Leakage in LCD Panel", May 2009.
Irina Nam et al., "Novel versatile pressure-sensitive adhesives for polarizing film of TFT-LCDs: Viscoelastic characteristics and light leakage performance", Jun. 23, 2011.

(Continued)

*Primary Examiner* — Arnel C Lavarias
(74) *Attorney, Agent, or Firm* — Rabin & Berdo, P.C.

(57) ABSTRACT

A hardcoat composition and a polarizer and a display device applying the same are provided. The hardcoat composition includes an acrylic copolymer, a multi-functional unsaturated photomonomer or oligomer, a photoinitiator, and a thermal curing agent. The acrylic copolymer with hydroxyl group has a weight-average molecular weight equal to or larger than 15,000 and has a glass transition temperature higher than 25° C.

7 Claims, No Drawings

(56) References Cited

U.S. PATENT DOCUMENTS

| | | |
|---|---|---|
| 6,717,559 B2 | 4/2004 | Weindorf |
| 6,717,642 B2 | 4/2004 | Sasaki et al. |
| 6,737,154 B2 | 5/2004 | Jonza et al. |
| 6,747,720 B2 | 6/2004 | Saiki et al. |
| 6,762,124 B2 | 7/2004 | Kian et al. |
| 6,762,811 B2 | 7/2004 | Sasaki et al. |
| 6,800,366 B2 | 10/2004 | Chang et al. |
| 6,805,048 B2 | 10/2004 | Pearson et al. |
| 6,807,005 B2 | 10/2004 | Honda et al. |
| 6,808,657 B2 | 10/2004 | Fansler et al. |
| 6,819,486 B2 | 11/2004 | Ma et al. |
| 6,829,026 B2 | 12/2004 | Sasaki et al. |
| 6,846,568 B2 | 1/2005 | Yamaya et al. |
| 6,847,419 B2 | 1/2005 | Kusumoto et al. |
| 6,859,241 B2 | 2/2005 | Hamamoto et al. |
| 6,876,414 B2 | 4/2005 | Hara et al. |
| 6,878,441 B2 | 4/2005 | Kondo et al. |
| 6,897,916 B2 | 5/2005 | Hamamoto |
| 6,903,788 B2 | 6/2005 | Shiraogawa et al. |
| 6,909,544 B2 | 6/2005 | Kolosowsky |
| 6,930,737 B2 | 8/2005 | Weindorf et al. |
| 6,933,991 B2 | 8/2005 | Sanelle et al. |
| 6,940,643 B2 | 9/2005 | Ma et al. |
| 6,949,207 B2 | 9/2005 | Jones et al. |
| 6,949,297 B2 | 9/2005 | Yang et al. |
| 6,954,240 B2 | 10/2005 | Hamamoto et al. |
| 6,958,797 B2 | 10/2005 | Kawahara et al. |
| 6,970,213 B2 | 11/2005 | Kawahara et al. |
| 6,998,179 B2 | 2/2006 | Fansler et al. |
| 7,030,945 B2 | 4/2006 | Umemoto et al. |
| 7,046,443 B2 | 5/2006 | Miyatake |
| 7,054,049 B2 | 5/2006 | Murakami et al. |
| 7,064,896 B2 | 6/2006 | Kuwamura |
| 7,087,194 B2 | 8/2006 | Jones et al. |
| 7,110,072 B2 | 9/2006 | Roska et al. |
| 7,110,178 B2 | 9/2006 | Trapani et al. |
| 7,126,754 B2 | 10/2006 | Yamaoka et al. |
| 7,138,173 B2 | 11/2006 | Wheatley et al. |
| 7,193,248 B2 | 3/2007 | Weindorf et al. |
| 7,198,831 B2 | 4/2007 | Watanabe et al. |
| 7,229,684 B2 | 6/2007 | Enniss et al. |
| 7,234,816 B2 | 6/2007 | Bruzzone et al. |
| 7,235,283 B2 | 6/2007 | Adachi et al. |
| 7,236,286 B2 | 6/2007 | Clikeman et al. |
| 7,252,733 B2 | 8/2007 | Wang et al. |
| 7,262,752 B2 | 8/2007 | Weindorf |
| 7,264,865 B2 | 9/2007 | Matsunaga et al. |
| 7,285,313 B2 | 10/2007 | Kim et al. |
| 7,288,297 B2 | 10/2007 | Kawai et al. |
| 7,297,209 B2 | 11/2007 | Lazarev et al. |
| 7,309,737 B2 | 12/2007 | Kim et al. |
| 7,315,418 B2 | 1/2008 | DiZio et al. |
| 7,317,498 B2 | 1/2008 | Hara et al. |
| 7,318,960 B2 | 1/2008 | Yamamoto et al. |
| 7,326,451 B2 | 2/2008 | Takeda et al. |
| 7,351,470 B2 | 4/2008 | Draheim et al. |
| 7,355,663 B2 | 4/2008 | Saiki et al. |
| 7,368,161 B2 | 5/2008 | McGurran et al. |
| 7,369,122 B2 | 5/2008 | Cross et al. |
| 7,391,569 B2 | 6/2008 | Ralli et al. |
| 7,393,570 B2 | 7/2008 | Takeda et al. |
| 7,405,779 B2 | 7/2008 | Sanelle et al. |
| 7,405,784 B2 | 7/2008 | Roska et al. |
| 7,405,857 B2 | 7/2008 | Ma et al. |
| 7,443,585 B2 | 10/2008 | Hara et al. |
| 7,446,848 B2 | 11/2008 | Takeda et al. |
| 7,462,390 B2 | 12/2008 | Kim et al. |
| 7,463,417 B2 | 12/2008 | Duncan et al. |
| 7,491,287 B2 | 2/2009 | Behr et al. |
| 7,494,708 B2 | 2/2009 | Everaerts et al. |
| 7,548,290 B1 | 6/2009 | Kitamura et al. |
| 7,573,550 B2 | 8/2009 | Lubart et al. |
| 7,573,642 B2 | 8/2009 | Lubart et al. |
| 7,581,832 B2 | 9/2009 | Begon et al. |
| 7,593,076 B2 | 9/2009 | Yanai et al. |
| 7,593,079 B2 | 9/2009 | Takeda et al. |
| 7,595,934 B2 | 9/2009 | Lubart et al. |
| 7,622,168 B2 | 11/2009 | Ogasawara et al. |
| 2004/0053159 A1* | 3/2004 | Wilke ............... C08G 18/6254 430/270.1 |
| 2012/0308798 A1 | 12/2012 | Ryu et al. |
| 2012/0320314 A1 | 12/2012 | Lin et al. |

FOREIGN PATENT DOCUMENTS

| | | |
|---|---|---|
| CN | 102666737 A | 9/2012 |
| JP | H08-311398 A | 11/1996 |
| JP | 2006-163082 A | 6/2006 |
| JP | 2007-002048 A | 1/2007 |
| JP | 2007-046031 A | 2/2007 |
| JP | 2010-285480 A | 12/2010 |
| JP | 2011-074351 A | 4/2011 |
| JP | 2011-126921 A | 6/2011 |
| JP | 2013-213173 A | 10/2013 |
| JP | 2014-130298 A | 7/2014 |
| JP | 5876195 B1 | 3/2016 |
| TW | I315415 B | 10/2009 |
| TW | 201041740 A | 12/2010 |
| TW | 201245366 A | 11/2012 |
| TW | 201425508 A | 7/2014 |
| WO | WO 2011-065099 A1 | 6/2011 |
| WO | WO 2012-160891 A1 | 11/2012 |

OTHER PUBLICATIONS

Japanese Office Action dated Sep. 13, 2016 with translation.
Chinese Office Action dated Jun. 1, 2017.

* cited by examiner

HARDCOAT COMPOSITION AND POLARIZER AND DISPLAY DEVICE APPLYING THE SAME

This application claims the benefit of Taiwan application Serial No. 103131314 filed on Sep. 11, 2014; the subject matter of which is incorporated herein by reference.

TECHNICAL FIELD

The present disclosure relates to a hardcoat composition and a polarizer and a display device applying the same.

DESCRIPTION OF THE RELATED ART

In a conventional liquid crystal display device, the structure of a polarizer includes: thermal cured acrylic pressure sensitive adhesive/triacetate cellulose (TAC)/polyvinyl alcohol (PVA) hydrogel/iodine-impregnated PVA film (PVA polarizer)/PVA hydrogel/TAC. The overall thickness of the polarizer is about 150~200 micrometers (μm); and the manufacturing process of the polarizer is complicated, with low yields.

The panel makers have been looking for and developing new process, for simplifying the laminating process of polarizers with the LCD devices. In recent years, companies such as Nitto Denko Corporation and Sumitomo Chemical Co., Ltd. have provided new structures of polarizers; such as replacing TAC films with novel transparent polymer films, replacing PVA hydrogel with UV curable PVA material and so on. And the companies have developed a roll-to-roll process for laminating polarizers with the LCD devices.

SUMMARY

The present disclosure relates to a polarizer and a display device in which a hardcoat composition replaces the PVA hydrogel and TAC films of conventional polarizers.

According to some embodiments of the present disclosure, a hardcoat composition is provided. The hardcoat composition includes an acrylic copolymer having a hydroxyl group; a multi-functional unsaturated photomonomer or oligomer; a photoinitiator; and a thermal curing agent. The acrylic copolymer has a weight-average molecular weight equal to or more than 15,000, and the acrylic copolymer has a glass transition temperature higher than 25° C.

According to another embodiment of the present disclosure, a thin-type polarizer is provided. The thin-type polarizer includes an iodine-impregnated polyvinyl alcohol (PVA) film and a hardcoat layer made from a hardcoat composition and formed directly on at least one side of the iodine-impregnated PVA film. The hardcoat composition includes an acrylic copolymer having a hydroxyl group; a multi-functional unsaturated photomonomer or oligomer; a photoinitiator; and a thermal curing agent. The acrylic copolymer has a weight-average molecular weight equal to or more than 15,000, and the acrylic copolymer has a glass transition temperature of higher than 25° C.

According to a further embodiment of the present disclosure, a display device is provided. The display device includes a thin-type polarizer. The thin-type polarizer includes an iodine-impregnated polyvinyl alcohol (PVA) film and a hardcoat layer made from a hardcoat composition and formed directly on at least one side of the iodine-impregnated PVA film. The hardcoat composition includes an acrylic copolymer with a hydroxyl group; a multi-functional unsaturated photomonomer or oligomer; a photoinitiator; and a thermal curing agent. The acrylic copolymer has a weight-average molecular weight equal to or more than 15,000, and the acrylic copolymer has a glass transition temperature higher than 25° C.

The present disclosure will now be described based on preferred embodiments thereof.

DETAILED DESCRIPTION

In the embodiments of the present disclosure, the hardcoat layer made from a thermally cured hardcoat composition can be formed directly on at least one side of the iodine-impregnated polyvinyl alcohol (PVA) film; it does not require any binders or adhesives and does not require TAC protection films. As a result, it can simplify the manufacturing process, reduce costs, and reduce the overall thickness of the polarizer significantly. Details of embodiments of the present disclosure are disclosed hereinafter. The embodiments are for explaining only, and this disclosure is not limited to the embodiments. A person having ordinary skill in the art may modify or change corresponding details of the embodiments for applications.

According to the embodiments of the present disclosure, a hardcoat composition is provided. The hardcoat composition includes an acrylic copolymer having a hydroxyl group; a multi-functional unsaturated photomonomer or oligomer; a photoinitiator; and a thermal curing agent. The acrylic copolymer has a weight-average molecular weight (Mw) such as equal to or more than 15,000, and the acrylic copolymer has a glass transition temperature (Tg) such as higher than 25° C.

According to the embodiments of the present disclosure, the hardcoat composition can be applied to any surface that requires protection; for example, it can be applied on surfaces of iodine-impregnated PVA polarizers. In an embodiment, the components of the hardcoat composition are mixed well and then coated on a PET release film. Next, the hardcoat composition on the PET release film is heated at a temperature of such as 60-110° C. At this stage, the acrylic copolymer and the thermal curing agent undergo a thermal-crosslink reaction while the rest components (e.g. the multi-functional unsaturated photomonomer or oligomer and the photoinitiator) do not react. The thermally cured hardcoat composition turns into a gel state with increased viscosity and can act as a pressure sensitive adhesive. Accordingly, the hardcoat layer made from the hardcoat composition can be formed directly on at least one side of an iodine-impregnated PVA film without additional PVA hydrogel or adhesives or TAC films.

In the embodiment, the hardcoat composition includes 0.1-60 weight parts of the thermal curing agent with respect to 100 weight parts of the acrylic copolymer. In the embodiment, the thermal curing agent may include aliphatic polyisocyanate. In an embodiment, aliphatic polyisocyanate is such as 0.3 weight parts with respect to 100 weight parts of the acrylic copolymer.

In the embodiment, the acrylic copolymer may be synthesized from lipophilic acrylic monomer or vinyl aromatic monomer, and hydroxyl acrylic monomer. The hydroxyl acrylic monomer can react with the thermal curing agent to form a crosslink structure for increasing the heat resistance and mechanical strength of the acrylic copolymer. In the embodiment, the molar ratio of the hydroxyl acrylic monomer should be within a suitable range; while the molar ratio of hydroxyl acrylic monomer is too low, the degree of crosslinking after heating would be too low, such that the cohesion of the hardcoat would be too low to form a film; while the molar ratio of hydroxyl acrylic monomer is too high, the degree of crosslinking after heating would be too high, such that the hardcoat would lose viscosity and thus cannot be used as a pressure sensitive adhesive. In an embodiment the acrylic copolymer includes such as 0.6-20 wt % of hydroxyl acrylic monomer. In a preferred embodiment the acrylic copolymer includes such as 0.8-15 wt % of hydroxyl acrylic monomer.

In the embodiment, the lipophilic acrylic monomer may include (meth)acrylic acid alkyl ester monomer, such as methyl acrylate, ethyl acrylate, butyl acrylate, dodecyl acrylate, methyl methacrylate, butyl methacrylate, cyclohexyl methacrylate, 2-ethylhexyl acrylate, isobornyl acrylate; or any combinations thereof. In the embodiment, the vinyl aromatic monomer may include such as styrene. In the embodiment, the hydroxyl acrylic monomer may include such as 2-hydroxyethyl methacrylate, 2-hydroxyethyl acrylate, 4-hydroxybutyl acrylate; or any combinations thereof. However, the lipophilic acrylic monomers and the hydroxyl acrylic monomers may be selected according to actual needs and are not limited to the above-mentioned examples.

In the embodiment, the acrylic copolymer may be synthesized by solution polymerization. Suitable solvents include dichloromethane, chloroform, tetrachloromethane, acetone, methyl ethyl ketone, diethyl ketone, propyleneglycol monomethyl ether acetate, ethyl acetate, butyl acetate, toluene, and etc. If the reaction temperature is higher than the boiling point of the solvent used, the polymerization reaction should be conducted with suitable condenser or under a pressure. Alternatively, mixture of two or more solvents can be used in the reaction. In an embodiment, mixture of propyleneglycol monomethyl ether acetate and acetone is used to adjust the viscosity and volatility of the reaction solution.

In an embodiment, the hardcoat composition has a gel fraction of such as 0.5-75% after thermal curing at a temperature of 70-110° C. and aging at room temperature for 6 days. In another embodiment, the hardcoat composition has a gel fraction of such as 5-50% after thermal curing at a temperature of 60-110° C. or 70-110° C. and aging at room temperature for 6 days. In a further embodiment, the hardcoat composition has a gel fraction of such as 15-40% after thermal curing at a temperature of 60-110° C. and aging at room temperature for 6 days. The unreacted multi-functional unsaturated photomonomers or oligomers in the thermal cured hardcoat composition can be used as diluents of the acrylic copolymer, so that the hardcoat composition can act as a pressure sensitive adhesive.

Furthermore, the glass transition temperature of a pressure sensitive adhesive is generally negative, such as −50° C.-20° C., and the glass transition temperature of a hardcoat is positive. According to the embodiments of the present disclosure, the glass transition temperature of the acrylic copolymer is higher than 25° C., such as 40° C., which is much higher than that of conventional pressure sensitive adhesives, thereby providing a hardness to the hardcoat formed subsequently.

The hardcoat composition is coated on a PET release film, heated and thermally cured, then laminated directly to at least one side of an iodine-impregnated PVA film, followed by UV irradiation to the hardcoat composition. At the UV irradiation step the multi-functional unsaturated photomonomers or oligomers undergo a photo-crosslinking reaction with the photoinitiators. The thermally cured acrylic copolymer and the polymer structure of the photo-cured multi-functional unsaturated photomonomers or oligomers are interpenetrating. As a result, a hardcoat layer can be formed directly on the iodine-impregnated PVA film, without applying any binders or adhesives.

In other words, before photo-curing, the hardcoat composition of the embodiments can be laminated to iodine-impregnated PVA films directly. After laminated with PVA films, the hardcoat composition is irradiated with UV light, then the photo-cured hardcoat composition will have a hardness of 1 H or higher; as such, it can protect the iodine-impregnated PVA films without any TAC films.

In the embodiment, the multi-functional unsaturated photomonomer or oligomer may include ethoxylated (3) Trimethylolpropane Triacrylate, dipentaerythritol hexaacrylate, tripropylene glycol diacrylate, pentaerythritol tetraacrylate, tris (2-hydroxy ethyl) isocyanurate triacrylate, ethoxylated bisphenol A diacrylate, isobornyl acrylate, aliphatic urethane acrylate, epoxy acrylate; or any combinations thereof. Aliphatic urethane acrylate may be an aliphatic polyester based urethane diacrylate oligomer of trade names CN 964, CN 9010, and CN 968 from Sartomer; and epoxy acrylate may be a compound of trade names CN 131 and CN 132 from Sartomer. However, the multi-functional unsaturated photomonomers or oligomers may be selected according to actual needs, and not limited thereto.

In an embodiment, the hardcoat composition may include 30-150 weight parts of the multi-functional unsaturated photomonomer or oligomer, with respect to 100 weight parts of the acrylic copolymer. In a preferred embodiment, the hardcoat composition may include 60-100 weight parts of the multi-functional unsaturated photomonomer or oligomer, with respect to 100 weight parts of the acrylic copolymer.

In the embodiment, the hardcoat composition may include 0.5~20 weight parts of the photoinitiator, with respect to 100 weight parts of the acrylic copolymer. The photoinitiator may be such as 1-hydroxycyclohexyl phenyl ketone (Ciba IRGACURE 184) and/or KB1 (Ciba IRGACURE 651). In a preferred embodiment, the above-mentioned photoinitiator may be such as 2~10 weight parts, with respect to 100 weight parts of the acrylic copolymer.

In the embodiment, the hardcoat composition may further include a catalyst, such as dibutyltin dilaurate. In the embodiment, the catalyst is such as 0.001 weight part, with respect to 100 weight parts of the acrylic copolymer.

In the embodiment, additives such as defoamer, leveling agents, and/or plasticizers may be added into the hardcoat composition.

According to the embodiments of the present disclosure, the hardcoat layer formed by curing the hardcoat composition can be formed directly on at least one side of an iodine-impregnated PVA film without applying any binders or adhesives, and no TAC film required. In other words, the hardcoat layer made from the hardcoat composition can replace the PVA hydrogel and TAC of conventional polarizer. As a result, it can simplify the manufacturing process, reduce costs, and reduce the overall thickness of the polarizer significantly. For example, a polarizer of conventional structure (TAC/PVA hydrogel/iodine-impregnated PVA polarizer/PVA hydrogel, TAC, and pressure sensitive adhesive) has an overall thickness of about 210 μm, in which the thickness of TAC film is about 40-80 μm. Replacing PVA hydrogel and TAC film with the hardcoat layer of the embodiments, the overall thickness of the polarizer can be significantly reduced to below 90 μm, which is advantageous for the manufacture of ultra-thin type liquid crystal displays. Moreover, the hardcoat layer made from the hardcoat composition has low birefringence, and thus the polarizer will have a wider viewing angle than that of a polarizer made of conventional TAC film which has high birefringence.

The following examples provide further explanation. Components of acrylic copolymers and hardcoat compositions and the test results thereof are listed, showing the features of the hardcoat composition and the hardcoat layer formed thereof. However, the following examples are for describing particular embodiments only, and are not intended to be limited.

Synthesis of Acrylic Copolymer 1

First, 240.37 g propyleneglycol monomethylether (PM) is added into a four-necked reaction flask. Then the four-necked reaction flask is filled with nitrogen gas and the temperature of the flask is raised to 90° C.

Next, a reaction solution of 98.12 g methyl methacrylate (MMA), 130.64 g butyl methacrylate (BMA), 11.61 g 2-hydroxyethyl methacrylate, 2.07 g 1-dodecanethiol (1-DT), and 0.9114 g AIBN is added into the four-neck reaction flask. The reaction proceeds for 7 hours. As the reaction is complete, 53.42 g acetone is added for dilution. The acrylic copolymer solution obtained has a weight-average molecular weight (Mw) about 26,109.

The syntheses of acrylic copolymers 2~4 are similar to that of acrylic copolymer 1. The components of acrylic copolymers 1~4 are listed in table 1.

TABLE 1

| Components (g) | Acrylic copolymer 1 | Acrylic copolymer 2 | Acrylic copolymer 3 | Acrylic copolymer 4 |
|---|---|---|---|---|
| 1-DT | 2.07 | | | |
| Monomers | | | | |
| MMA | 98.12 | 78.09 | | 99.12 |
| BMA | 130.64 | 113.60 | | 88.04 |

TABLE 1-continued

| Components (g) | Acrylic copolymer 1 | Acrylic copolymer 2 | Acrylic copolymer 3 | Acrylic copolymer 4 |
|---|---|---|---|---|
| 2-ethylhexyl acrylate | | | | 70.03 |
| Isobornyl acrylate | | 83.33 | | |
| Styrene | | | 197.87 | |
| 2-hydroxyethyl methacrylate | 11.61 | | 13.01 | 1.30 |
| 2-hydroxyethyl acrylate | | 2.32 | | |
| Total | 241.82 | 277.35 | 210.88 | 258.49 |
| Solvent (g) | | | | |
| propyleneglycol monomethylether (PM) | 240.37 | 338.98 | | |
| Toluene | | | 257.74 | |
| Acetone | 53.42 | | | 315.93 |
| Initiator (g) | | | | |
| AIBN | 0.9114 | 0.38 | 0.21 | 0.63 |
| Tg (° C.) | 51.49 | 59.41 | 92.40 | 20.47 |
| Molecular weight (Mw) | 26,109 | 66,324 | 124,709 | 39,972 |

The hardcoat compositions of examples 1~10 include the above mentioned acrylic copolymers 1~4. The components and the features of the hardcoat compositions of examples 1~10 are listed in table 2.

TABLE 2

| Components (weight parts) | Example 1 | Example 2 | Example 3 | Example 4 | Example 5 | Comparative example 1 |
|---|---|---|---|---|---|---|
| acrylic copolymer 1 | 100 | 100 | | | | |
| acrylic copolymer 2 | | | 100 | 100 | | |
| acrylic copolymer 3 | | | | | 100 | |
| acrylic copolymer 4 | | | | | | 100 |
| Dibutyltin dilaurate (DBTDL) | 0.001 | 0.001 | 0.001 | 0.001 | 0.001 | 0.001 |
| Aliphatic polyisocyanate | 0.3 | 19 | 0.3 | 1.5 | 52 | 0.7 |
| Ethoxylated (3) trimethylolpropane triacrylate (SR-454) | | 10 | 10 | 40 | | 10 |
| Pentaerythritol tetraacrylate | | | | | 10 | |
| Dipentaerythritol hexaacrylate (DPHA) | | | | 10 | 20 | |
| Tripropylene glycol diacrylate (TPGDA) | 30 | 40 | 10 | 10 | | 10 |
| Ethoxylated bisphenol A diacrylate | | | 40 | | 70 | 40 |
| Aliphatic urethane acrylate CN 964 | 30 | 60 | | | | |
| 1-hydroxy-cyclohexyl phenyl ketone (184) | 2 | 2 | 2 | 2 | 5 | 2 |
| Total | 162.3 | 231 | 162.3 | 163.5 | 257 | 162.7 |
| Light transmittance (%) | 100 | 98.25 | 99.07 | 99.32 | 97.39 | 99.50 |
| Cross-cut test | 100/100 | 100/100 | 100/100 | 100/100 | 100/100 | 100/100 |
| Hardness | H | H | H | 2H | 2H | F |

The components of the hardcoat composition of example 1, listed in table 2, are mixed well, and then the hardcoat composition is coated on a PET release film, then heated at 100° C. for 2 minutes to remove the solvent and undergo thermal-crosslink reaction. Then a film of double layer structure made of hardcoat composition and PET film is formed. In this stage, the components in the hardcoat composition only undergo thermal crosslink reaction, and photo crosslink reaction has not occurred yet; so that the hardcoat composition can be laminated to PVA films. The hardcoat composition of example 1 has a gel fraction of 1% after aging.

The measurement of the gel fractions of hardcoat compositions is described as follows. The dried double layer structure of hardcoat composition/PET release film is aged at room temperature for six days. Scraped off about 0.3 g the hardcoat composition from the PET release film and add it to 10 g ethyl acetate (EA). Mix the ethyl acetate solution well, then filter the ethyl acetate solution out with a 250 mesh stainless steel mesh. Rinse the sample flask with 10 g of ethyl acetate and filter it out. Dry the stainless steel mesh and the gel residue at 100° C. for 30 minutes. Weight and calculate the gel fraction of the hard composition.

The above-mentioned double layer structure of hardcoat composition/PET release film is then laminated to at least one side of an iodine-impregnated PVA film, and then a pressure sensitive adhesive coated on a PET release film, is laminated to the PVA film opposite to the side of the double layer structure of hardcoat composition/PET release film. In other words, two sides of the iodine-impregnated PVA film are directly adhered with the hardcoat composition and the thermally cured pressure sensitive adhesive. Next, the hardcoat composition is exposed to UV light for photo-curing. As such, a thin-type polarizer is manufactured. The photo-cured hardcoat layer has features of 100% light transmittance, H~2 H hardness, and passed 100/100 cross-cut test.

In comparative example 1, the hydroxyl acrylic monomer ratio of acrylic copolymer 4 is too low; the degree of thermal crosslinking is too low, such that the cohesion of the hardcoat composition would be too low to form a film.

In addition, the hardcoat composition according to the embodiments of the present disclosure may be used to manufacture display devices including thin type polarizers. As photo crosslink reaction is complete, the PET release film on the pressure sensitive adhesive is removed, then the thin type polarizer is laminated to a display, and then the PET release film on the hardcoat is removed. As such, the display device is made with a thin-type polarizer manufactured according to the embodiments.

Embodiments 2~10 are synthesized according to the above-mentioned methods, and the features of the thin-type polarizers made according to the embodiments 2~10 are listed in table 2. The hardcoat composition of embodiment 2, after being aged, has a gel fraction of 23%.

The present disclosure has been disclosed as the preferred embodiments, however it is not intended to limit the present disclosure. A person having ordinary skill in the art can make various changes and alterations without departing from the spirit and scope of this disclosure.

What is claimed is:

1. A polarizer, comprising:
an iodine-impregnated polyvinyl alcohol (PVA) film; and
a hardcoat layer which is made from a hardcoat composition, the hardcoat layer formed directly on at least one side of the iodine-impregnated PVA film, wherein the hardcoat composition comprises:
an acrylic copolymer having a hydroxyl group, wherein the acrylic copolymer has a weight-average molecular weight equal to or more than 15,000, and the acrylic copolymer has a glass transition temperature higher than 25° C.;
a multi-functional unsaturated photomonomer or oligomer;
a photoinitiator; and
a thermal curing agent.

2. The polarizer according to claim 1, wherein the hardcoat composition comprises 30-150 weight parts of the multi-functional unsaturated photomonomer or oligomer with respect to 100 weight parts of the acrylic copolymer.

3. The polarizer according to claim 1, wherein the multi-functional unsaturated photomonomer or oligomer comprises dipentaerythritol hexaacrylate, tripropylene glycol diacrylate, pentaerythritol tetraacrylate, tris(2-hydroxy ethyl)isocyanurate triacrylate, ethoxylated bisphenol A diacrylate, isobornyl acrylate, aliphatic urethane acrylate, epoxy acrylate, or the combinations thereof.

4. The polarizer according to claim 1, wherein the hardcoat composition comprises 0.1-60 weight parts of the thermal curing agent with respect to 100 weight parts of the acrylic copolymer.

5. The polarizer according to claim 1, wherein the hardcoat composition has a gel fraction of 0.5-75% after thermal curing at a temperature of 70-110° C. and aging at room temperature for 6 days.

6. The polarizer according to claim 1, wherein the hardcoat composition has a gel fraction of 5~50% after thermal curing at a temperature of 70~110° C. and aging at room temperature for 6 days.

7. A display device comprising a thin-type polarizer, wherein the thin-type polarizer comprises:
an iodine-impregnated polyvinyl alcohol (PVA) film; and
a hardcoat layer made from a hardcoat composition, the hardcoat layer formed directly on at least one side of the iodine-impregnated PVA film, wherein the hardcoat composition comprises:
an acrylic copolymer with a hydroxyl group; wherein the acrylic copolymer has a weight-average molecular weight equal to or more than 15,000, and the acrylic copolymer has a glass transition temperature higher than 25° C.;
a multi-functional unsaturated photomonomer or oligomer;
a photoinitiator; and
a thermal curing agent.

* * * * *